Sept. 26, 1944.   S. ROSENZWEIG   2,359,000
SHOCK PROOF ISOLATOR
Filed April 4, 1942   3 Sheets-Sheet 1
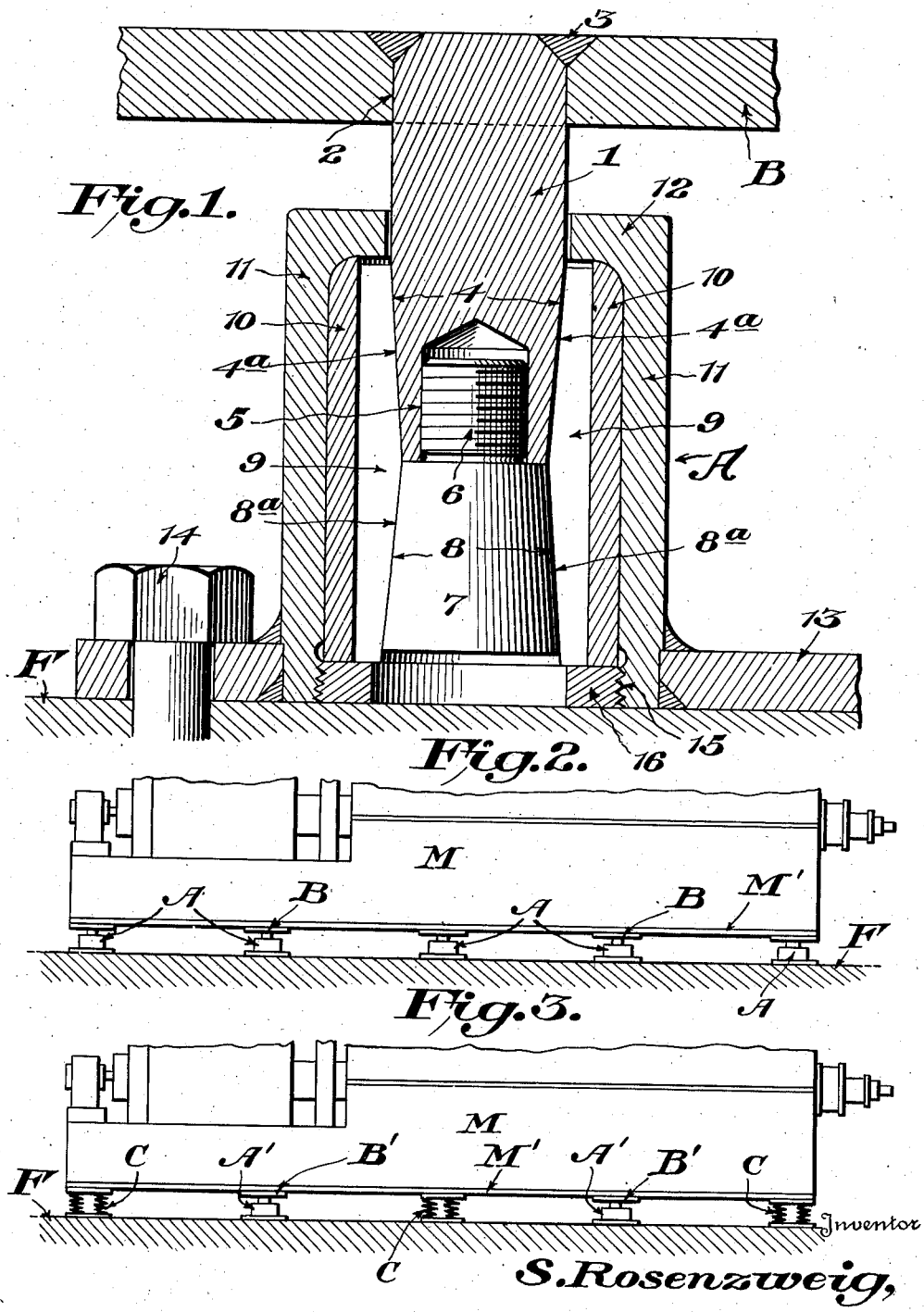
Inventor
S. Rosenzweig,
By William Steer & Groff
Attorneys Sept. 26, 1944.         S. ROSENZWEIG         2,359,000
SHOCK PROOF ISOLATOR
Filed April 4, 1942         3 Sheets-Sheet 2

Inventor
S. Rosenzweig,
By Willhaufter & Groff
Attorneys

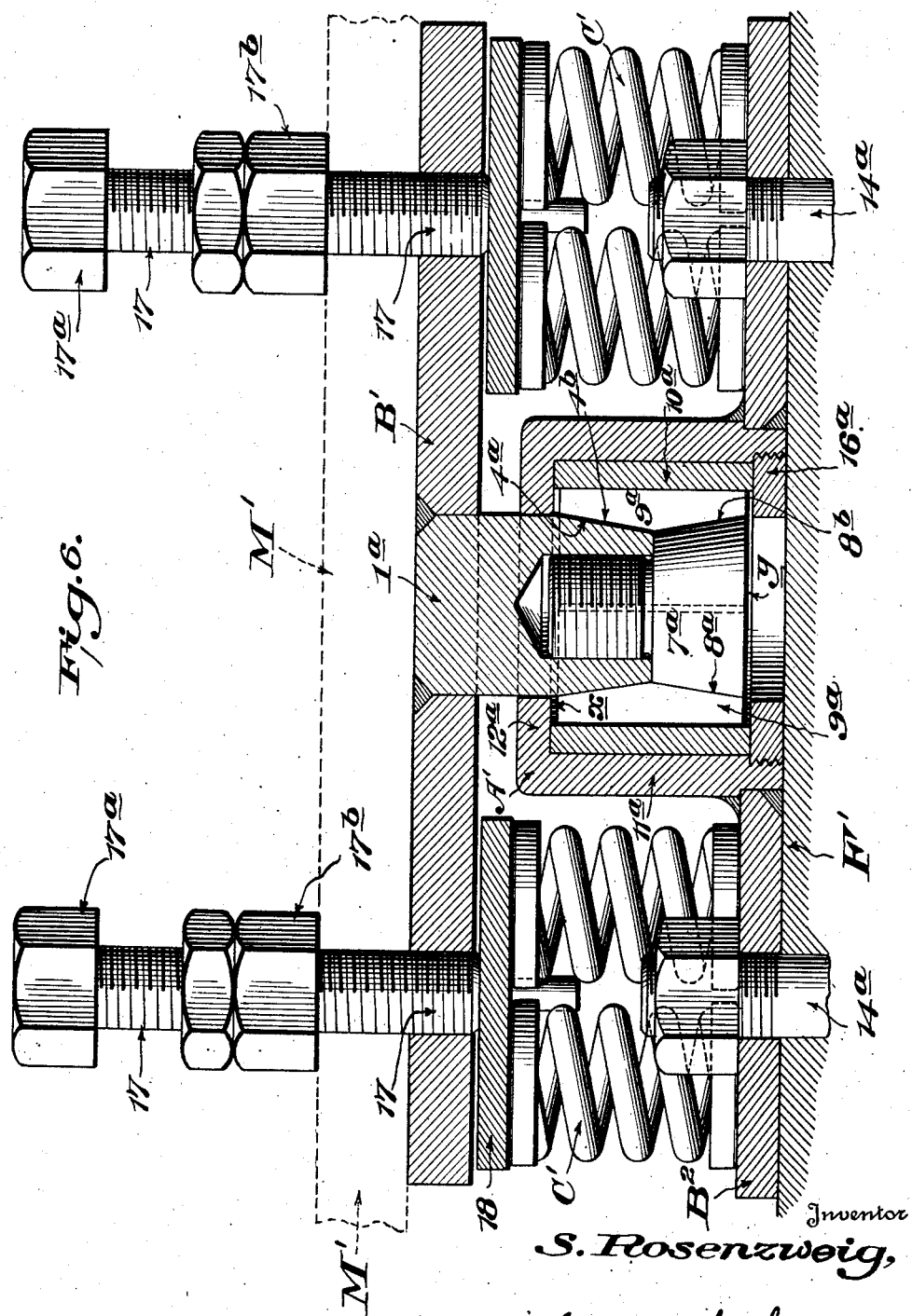

Patented Sept. 26, 1944

2,359,000

UNITED STATES PATENT OFFICE 2,359,000

SHOCKPROOF ISOLATOR

Siegfried Rosenzweig, New York, N. Y.

Application April 4, 1942, Serial No. 437,673

2 Claims. (Cl. 248—21)

This invention relates to shock proof isolators for machinery and the like, and more particularly to an improvement in isolators of the type which not only prevent transmission of vibration from the machine to its sub-base or foundation, or vice versa, but which are also adapted to take care of, that is cushion or absorb extraordinary extraneous shock of the type, for example, imposed on a building or vessel by the explosion of a bomb.

A primary object is to provide a plunger type device, including a post, having a tapered portion cooperating with friction shoes used in conjunction with isolating material of resilient character to constitute a vibration isolation unit which may also serve to check unusual shock. By changing the characteristics of the isolating material a wide range of vibration isolating or shock absorbing qualities may be obtained, whichever requirements are predominant. For example, on many stationary installations impacts occur principally in a vertical or near vertical direction and by using an isolating material with a large amount of damping the rebound can be reduced to a minimum. Therefore, a single acting plunger would be sufficient to act as both an isolator and a shock absorber.

A further object of the invention is to provide a construction which readily lends itself to conversion into a plunger of the double acting type for such cases where a rebound or shock of considerable magnitude occurs in an upward as well as a downward direction. It may thus be used as a double acting shock or check unit in conjunction with spring isolators, for instance, whether assembled in the same unit or separately positioned at selected locations between the base of the machine and the foundation or sub-base; to not only permit the isolator springs to operate within their normal predetermined mechanical range under usual conditions, but also absorb unusual shock which would tend to unduly compress or extend the isolator springs beyond their normal mechanical range.

A further object of the invention is to provide an isolator or shock absorber which is simple to manufacture and install and whose maintenance requirements are practically nil.

While it has been heretofore proposed to provide structures wherein rubber or the like has been bonded to joints and other parts subjected to vibration, and also rubber confined in a housing has been compressed by wedges bearing directly against the rubber, nevertheless such structures differ materially from the present invention which resides in the use of cooperating metallic friction elements which are in direct contact, certain of these elements being in the form of separate wedge blocks or shoes which are backed up by a confined non-metallic isolating material. In the present invention, the metallic frictional parts convert undesirable forces into work under the resistance of the confined isolation material, according to the demands of the particular installation, thus distinguishing from structures where rubber or the like merely serves as a filler or shim between parts exerting pressure thereon.

With the above and other objects in view, which will more readily appear as the nature of the invention is better understood, the same consists in the novel combination and arrangement of parts hereinafter more fully illustrated and claimed.

A preferred and practical embodiment of the invention is shown in the accompanying drawings, in which:

Fig. 1 is a vertical sectional view of the improved plunger type unit.

Fig. 2 is a diagrammatic side elevation illustrating the use of the plunger type unit as an isolator and as a shock absorbing unit.

Fig. 3 is a diagrammatic side elevation illustrating the application of the invention as a shock absorbing device in conjunction with spring isolators, and wherein the said isolators and shock absorbing unit are separately installed between the machinery base and foundation.

Fig. 6 is a vertical cross-sectional view taken on the line 6—6 of Fig. 4.

Similar reference characters designate corresponding parts throughout the several figures of the drawings.

Referring first to Figs. 1 to 2 of the drawings, the plunger device constituting the present invention is designated generally as A, and is intended to be positioned beneath a machine M, that is, between the base M' and the foundation F, as shown for example, in Fig. 2, where the plunger device is constructed to serve as a vibration isolator without the use of coil springs or other isolating media.

Fig. 3 of the drawings illustrates the application of a slightly modified plunger unit A' between the machinery base and the foundation F, preferably as a double acting shock absorber to prevent undue expansion or contraction of the spring isolators C, which, as shown, are not incorporated structurally with the device A', but are simply positioned at selected locations, as required, to meet the particular specifications involved.

Figure 4:
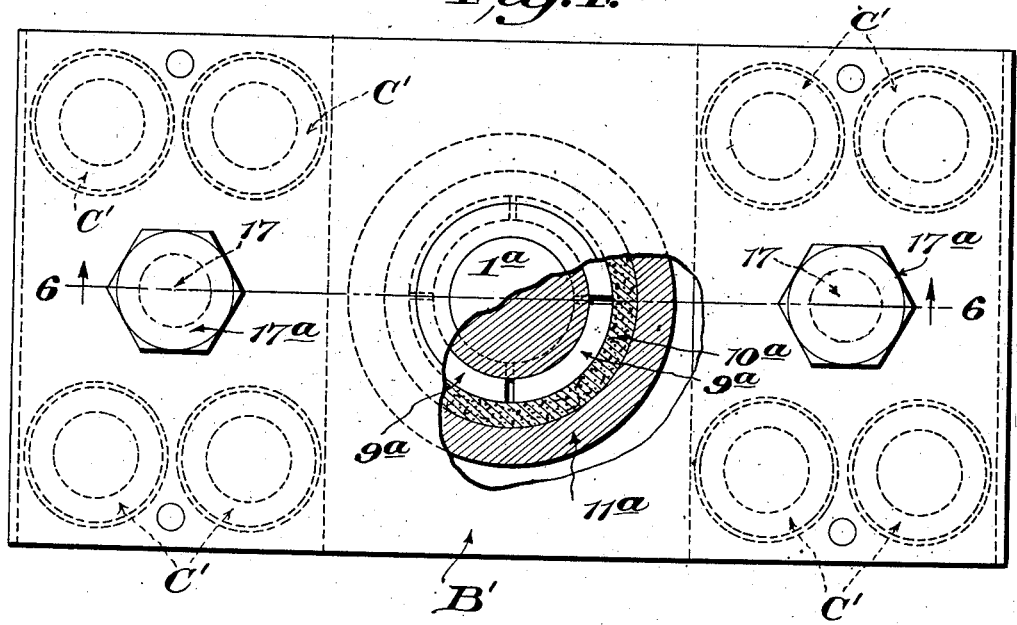
Fig. 4 is a top plan view, partly in section, of a combined spring isolator and plunger type device wherein the latter functions as a shock absorbing unit in conjunction with vibration isolation elements.
Figure 5:
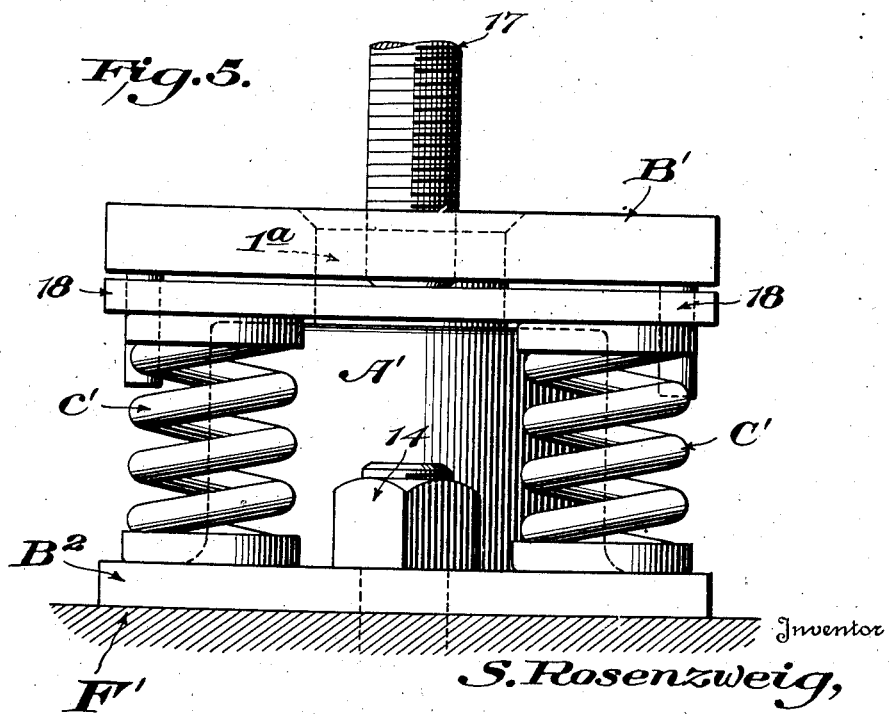
Fig. 5 is a side elevation of the construction shown in Fig. 4.

Figs. 4, 5 and 6 of the drawings illustrate the combination of the plunger device A' in a self contained structural unit including the isolating springs C' and also show the details of the device itself.

According to Fig. 1 of the drawings, the plunger device designated generally as A includes in its organization a central post 1 having its upper end fitted into an opening 2 of the top plate B or its equivalent, the said post being welded or otherwise securely affixed in position, as indicated at 3. Beginning approximately above its medial portion, the said post is of inwardly tapered formation as indicated at 4. At the bottom of the tapered portion 4, there is provided an internally screw threaded socket 5 which receives a threaded shank 6 of a base 7 which also has a tapered exterior 8 whose pitch or taper is opposite to that of the surface 4. The tapered faces 4 and 8 respectively of the parts 1 and 7 are preferably of frusto conical formation with the small diameter of each frustrum disposed in abutting relation. While the post 1 is shown and described as being of two parts to provide the double tapered portion referred to, this construction is simply a matter of convenience, because the post may have the base 7 integral therewith and surfaces 4 and 8 are then formed by turning, or otherwise, directly from the body of the post itself. The surfaces 4 and 8 cooperate with the corresponding wedge faces 4a or 8a of the segmental and relatively laterally movable friction wedge blocks or shoes 9. In that connection, however, it may be pointed out that when the post 1 serves as a single acting plunger the tapered surface 4 may be all that is required to cooperate with the surfaces 4a of the wedge blocks 9. In other words, since the post is loaded from above the load acts downwardly to cause surfaces 4 and 4a to engage and compress the isolating material 10. In any event it will be apparent that the tapered surfaces of the plunger 1 and the base 7 cooperate with their respective frictional wedging faces of the blocks 9, depending on the use to which the device is put, to provide friction vibration or shock absorbing means in conjunction with the elastic or yielding non-metallic isolator lining 10 contained within the housing 11.

The said housing is provided at its upper end with an inturned abutment flange 12 having a central opening for receiving and guiding the post 1 while its lower end is anchored to the foundation by any appropriate means, such, for example, as the plate 13 into which the lower end of the casing is fitted and secured by welding or other appropriate means. It will of course be understood that the anchoring plate 13 may be secured directly to the foundation F by bolts 14 or the like. The lower end of the casing 11 is internally threaded as at 15 to receive an externally threaded abutment ring 16, which, as shown in Fig. 1 has the lower ends of the shoes 9 in direct metallic engagement therewith. However, it will be noted that the shoes 9 are of less length than the distance between the inner faces of the abutments 12 and 16. The non-metallic isolating liner 10 may be of any material suitable for the purpose, such, for example, as cork, rubber, or any artificial material having the desired resiliency and vibration absorbing qualities. As shown, this material 10 is preferably co-extensive with the rear face of the shoes 9 and in Fig. 1 the lower edges of the shoes preferably abut or rest directly on the abutment ring 16.

The liner 10 serves to hold the inwardly directed inclined friction surfaces of the shoes in mating engagement with the corresponding surfaces of the post with sufficient force to initially arrest and hold the shoes during normal movement of the plunger to absorb vibrations within a predetermined range and also to cause the plunger to carry the shoes with it under abnormal shock until they strike one of the abutments 12 or 16.

As previously explained, Fig. 2 of the drawings illustrates the application of the invention as a single acting as well as a double acting plunger to a machinery base and foundation where the plunger device primarily functions as an isolator but may also act in an emergency as a shock absorber. In other words, these functions can be combined without springs.

Fig. 3 diagrammatically illustrates, however, the use of the plunger as a double acting device for absorbing shock or force of a magnitude which would tend to cause the isolator springs C to unduly contract or elongate, the plunger units being separate from the spring isolators. According to Fig. 3, the plunger device A' may be used in any desired spacing arrangement with respect to the isolators C, but as previously indicated, Figs. 4, 5 and 6 of the drawings show the combination of the device A' with isolator springs in a single self-contained unit.

Referring to Fig. 6, it will be observed that the said plunger type device is used in conjunction with a top plate B' and a bottom plate B2, the former resting on the foundation F' and being secured thereto by the bolts 14a or their equivalent. The upper plate B' is provided with adjusting bolts or screws 17 which in cooperation with the lock nuts 17a and 17b serve the dual function of supporting the machinery base M' and also regulating the tension on the straps 18 overlying the isolator springs C'.

The structural features and characteristics of the plunger type unit A' are essentially the same as those described in connection with the plunger device A of Fig. 1. For example, the vertically movable post or plunger 1a is secured to the upper plate B' and has its lower end provided with the base 7a while the outer surface of the post 1a and base 7a have the tapered surfaces 4a and 8a respectively for engaging with the tapered surfaces 4b and 8b of the laterally movable segmental wedge blocks 9a which are backed up and resisted by the elastic non-metallic isolating lining 10a confined in the housing 11a. In this embodiment of the invention, the isolating material 10a is preferably of less resilient character than the material 10 in the embodiment shown in Fig. 1, since in the construction now being described the normal or calculated vibrations of the machine are primarily taken care of by the isolator springs C or C'. It may also be pointed out that in Figs. 3–6 inclusive the wedge shoes 9a terminate short of the inturned flange 12a and the abutment ring 16a thereby to provide the spaces or clearances x and y at opposite ends of the wedge blocks so that they will not function or come into play except when the isolator springs C or C' are unduly compressed or extended since they are intended to function within a given frequency range according to the predetermined load they are intended to carry. This latter spacing feature is the principal modification over Figure 1. Under normal conditions, the isolator springs may contract and elongate slightly due to the vibration of the machine, or on the other hand, due to vibrations transmitted to the machine from the foundation F'. However, in the case of the installation being subjected to an unusual shock, such as that resulting from force incident to the explosion of a mine or bomb, which will tend to cause the isolator springs to unduly expand or contract, the plunger device A' will then come into play and check excessive elongation or prevent the collapse of the springs C or C', as the case may be.

For example, if the force of the unusual shock is manifested in a direction downward from the machine base M' the springs C or C' will compress and likewise the plunger 1a will descend carrying the shoes 9a with it until the lower ends of the shoes travel through the space y and engage the abutment 16a. Thereupon, the faces 4a and 4b will frictionally engage and cushion the compression of the springs. Alternatively, if the unusual shock generates a force which is transmitted from the foundation F' upwardly, the faces 8a and 8b respectively of the plunger 1a and friction shoes 9a will slide to frictionally spread the shoes 9a laterally against the isolation material 10a and prevent excessive elongation of the springs C'. It will, of course, be understood that the plunger and friction shoes may also engage in the alternate ways described to produce a cushioning effect when there is excessive movement between the machinery base and its foundation due to recoil resulting from either of the illustrations given.

As shown in both Figs. 1 and 6, the isolating material which backs up the wedge blocks may be co-extensive in height with the distance between the inner faces of the abutments 12 and 16 or 12a and 16a. In that connection, however, by reducing the height of the isolating material, this particular design can be efficiently used for a reduced impact. Expressing it in other words, by changing either the characteristics of the isolating material or the surface of the isolating material engaged by wedges 9, the unit becomes adaptable for a wide range of impacts.

For example, assuming that the design shown is intended to absorb an impact of 25,000# in both directions with a movement of the plunger equal to ⅜" by reducing the height of the isolating material and using a material having different isolating characteristics, the impact can be reduced while maintaining the travel of ⅜". The vertical travel, is, of course, of great importance and should be made as long as possible in order to perform work. On account of pipe connections, ⅜" is about the maximum travel that can be utilized in connection with Diesel engines though, of course, this travel can be increased in connection with hammers and other machinery which are not handicapped by outside connections.

From the foregoing, it will be apparent that the distinctive feature of the present invention resides in providing a plunger type device having one or more friction surfaces intended to engage with corresponding friction surfaces on suitable shoes or wedge blocks which have their backs in engagement with non-metallic isolating material confined within a rigid housing or casing. The construction may be utilized in the capacity of a single acting plunger for isolating purposes and may also be used in the capacity of a double acting plunger to take care of situations involving unusual shock, which produces a force tending to separate the machine from the foundation. While the posts 1 and 1a are shown as of round cross section and cooperate with an annular series of wedge blocks, it will of course be understood that the post might be angular in transverse section and the wedges and the isolating material as well as the housing modified accordingly.

Also, in addition to resisting vertically manifested vibrations and shocks, that is those exerted perpendicular to the foundation, it will be readily apparent that the post and the wedges together with the housed isolating material have the capacity of resisting shocks manifesting themselves in horizontal directions, or directions at an angle to the perpendicular.

Without further description, it is thought that the advantages of the invention will be readily understood by those skilled in the art, and changes in the form and proportion of parts may be resorted to without departing from the spirit of the invention or the scope of the appended claims.

I claim:

1. A vibration isolator and shock absorbing device for isolating machinery bases and the like from a foundation, comprising, an annular housing adapted to rest on the foundation, upper and lower inwardly disposed abutments on the housing, a plurality of friction shoes of less length than the distance between said abutments thereby to provide space for the shoes to move relative to said abutments, said shoes having their inner faces provided with inwardly directed oppositely pitched inclined friction surfaces, a post also having inwardly directed oppositely pitched friction surfaces normally mating with related surfaces of the shoes, a resilient non-metallic vibration absorbing cushioning lining confined between the inner wall of said housing and the outer faces of said shoes under initial compression thereby to yieldingly hold the same interlocked with the post, whereby predetermined normal axial movement of the post relative to the shoes will cause the lining to absorb vibrations within a given range and abnormal axial movement of the post will cause said shoes to move therewith toward one of said abutments and upon engagement therewith compel further compression of said non-metallic lining and also cause the mating pair of inclined surfaces of the post and shoes opposite the abutment to frictionally absorb the load induced by abnormal shock.

2. A vibration isolator and shock absorbing device according to claim 1 wherein the post is made in detachably connected sections, each of said sections having an inwardly directed friction surface thereon.

SIEGFRIED ROSENZWEIG.